Sept. 10, 1957 C. R. FISHER, JR 2,806,086

TERMINATION FOR A TWO-WAY TRUNK CIRCUIT

Filed Oct. 20, 1954 10 Sheets-Sheet 1

INVENTOR.
CHARLES R. FISHER, JR.
BY Henry H. Gage
AGENT

Sept. 10, 1957 C. R. FISHER, JR 2,806,086

TERMINATION FOR A TWO-WAY TRUNK CIRCUIT

Filed Oct. 20, 1954 10 Sheets-Sheet 2

Sept. 10, 1957 C. R. FISHER, JR 2,806,086

TERMINATION FOR A TWO-WAY TRUNK CIRCUIT

Filed Oct. 20, 1954 10 Sheets-Sheet 6

Sept. 10, 1957 C. R. FISHER, JR 2,806,086

TERMINATION FOR A TWO-WAY TRUNK CIRCUIT

Filed Oct. 20, 1954 10 Sheets-Sheet 7

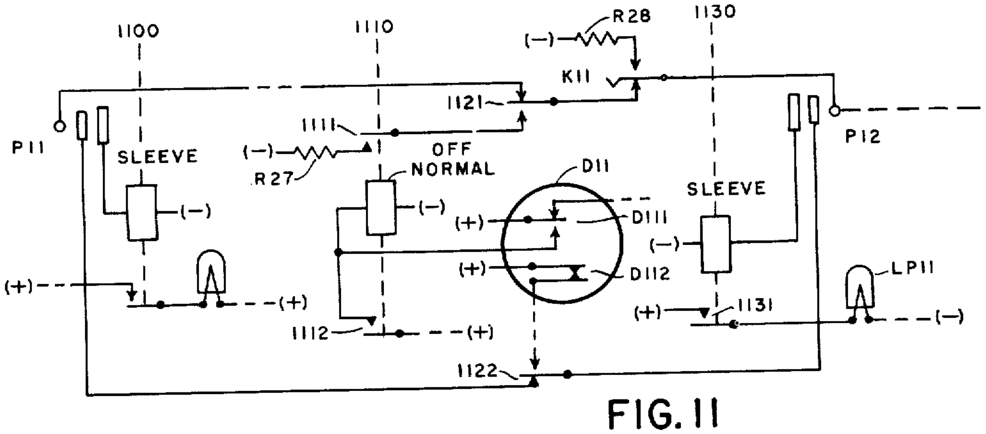
FIG. 11
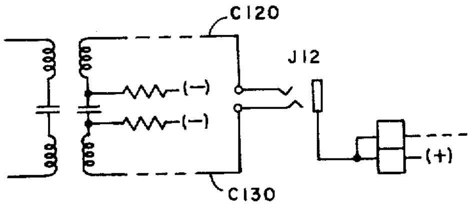
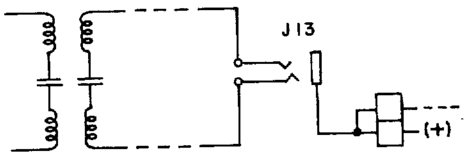
FIG. 12 FIG. 13
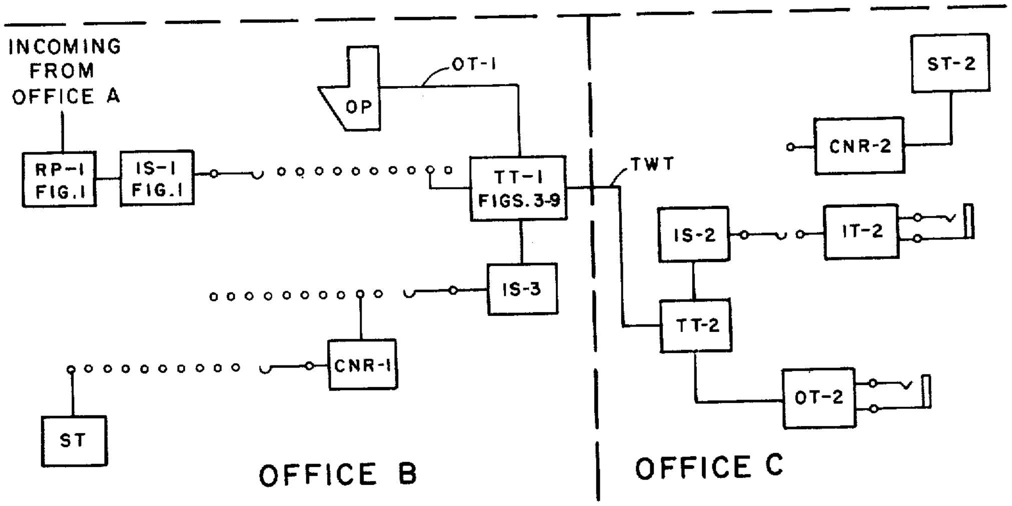
FIG. 14

United States Patent Office 2,806,086

Patented Sept. 10, 1957

2,806,086

TERMINATION FOR A TWO-WAY TRUNK CIRCUIT

Charles R. Fisher, Jr., Rochester, N. Y., assignor, by mesne assignments, to General Dynamics Corporation, a corporation of Delaware Application October 20, 1954, Serial No. 463,567

9 Claims. (Cl. 179—16)

This invention relates to telephone systems in general and more particularly to terminations for interoffice trunks used to connect two adjacent telephone offices.

In the past, it has been the practice to supply transmission level controlling pads individually associated with trunk terminations and means controllable from the termination for rendering the pads effective or ineffective dependent on the routing of calls in one direction only through the termination.

Accordingly, it is an object of this invention to provide a new and improved means for terminating interoffice trunks.

Another object of my invention is to provide pad controlling means in a two-way trunk termination.

Another object of my invention is to provide a termination for a two-way trunk circuit in which common means is employed for operating pad controlling means in the case of calls in a first direction and for controlling signaling in the case of calls in the other direction, thereby removing the necessity for supplying a separate relay for each function.

In order to accomplish the foregoing objects, I provide a two-way trunk terminated at both ends by trunk terminations include a pad for limiting the level of transmission on a trunk and relay means for rendering the pad effective and ineffective to limit transmission by controlling the insertion and removal, respectively, of the pad from the trunk. The controlling means is normally operative to cause the pad to limit the transmission level. On outgoing calls, relay means in the trunk termination is operative responsive to seizure by an incoming selector and from an operator position and other relay means is operative responsive to seizure of the termination by the apparatus in the operator position and to operation of the incoming switch train for causing the pad controlling means to remove the pad. Further means comprising apparatus in the operator position is provided to cause the pad control means to reinsert the pad in the trunk on calls from particular lines terminating at the operator position to an office over the trunk. On incoming calls, the second of the previously referred to relay means is controlled by level responsive means in an outgoing selector and is operative to cause the pad controlling means to render the pad ineffective with respect to the trunk. This level responsive relay means is also operative in response to operation of a ringing key in the operator's apparatus to send a timed signaling pulse forward to the apparatus in the calling office.

These and other features of my invention will be more apparent from a consideration of the following description read in connection with the accompanying drawings arranged as shown in Fig. 15 in which:

Fig. 9 shows trunk OT–1 from operator position OP to termination TT–1 and a portion of trunk TWT;

Fig. 11 shows a skeletonized form a cord circuit suitable for use in operator's position OP;

Figs. 12 and 13 show skeletonized forms of other line terminating apparatus suitable for use in operator position OP;

Fig. 14 shows a block diagram of the system in which my invention is incorporated.

Figure 1:
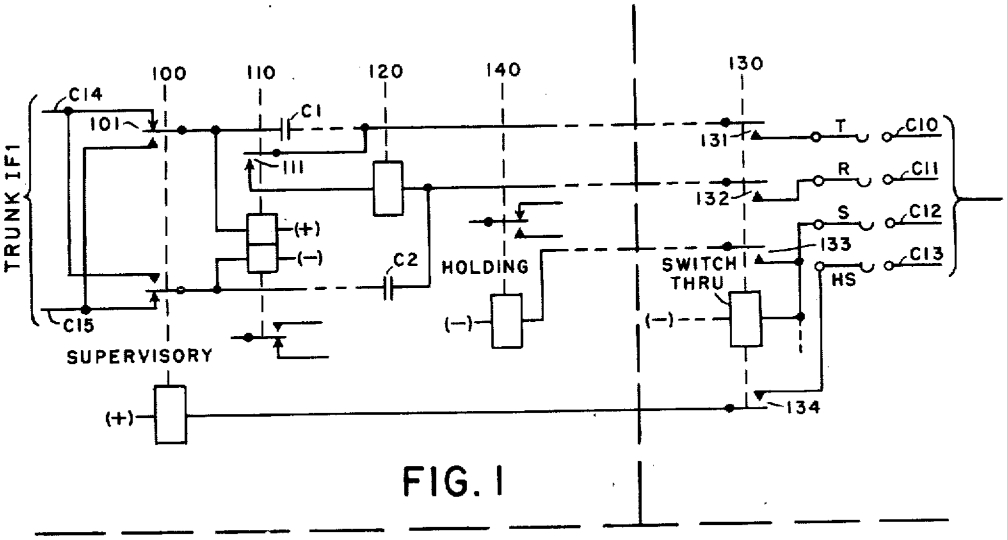
Fig. 1 shows skeletonized forms of repeater RP–1 and incoming selector IS–1.
Figure 2:
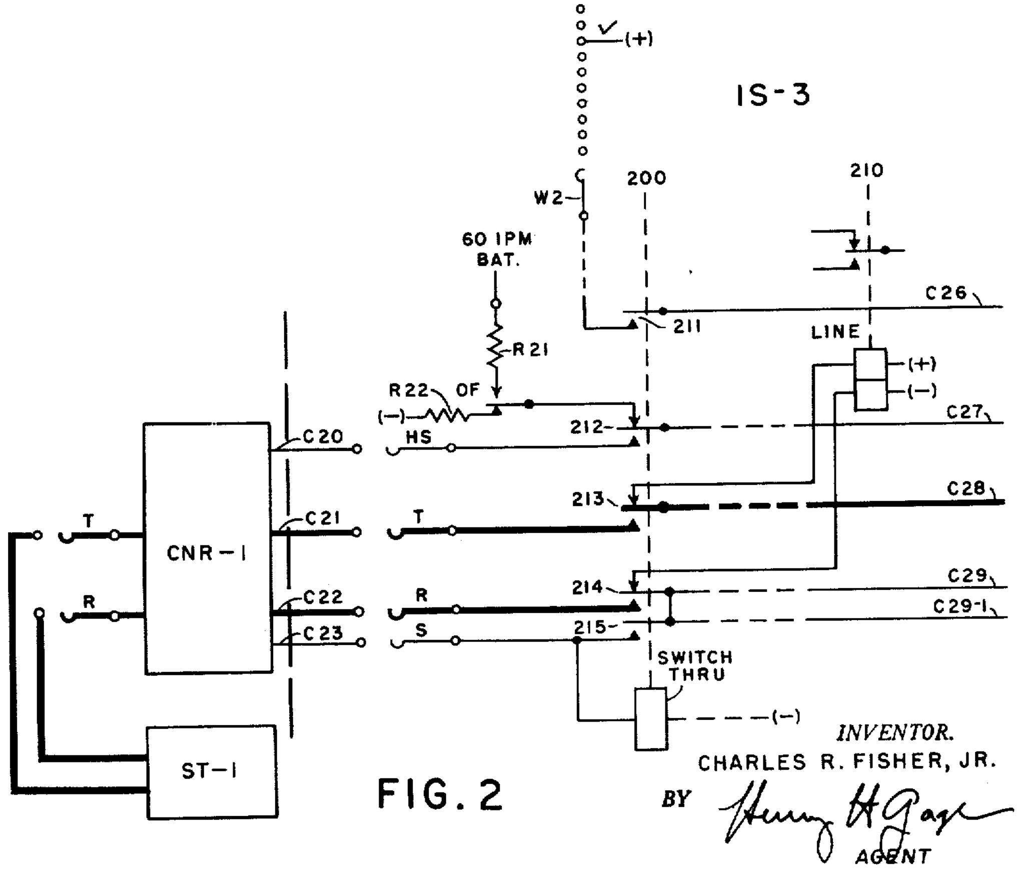
Fig. 2 shows skeletonized forms of incoming selector IS–3 and a block diagram of connector CNR–1 and subscriber telephone ST–1.
Figure 3:
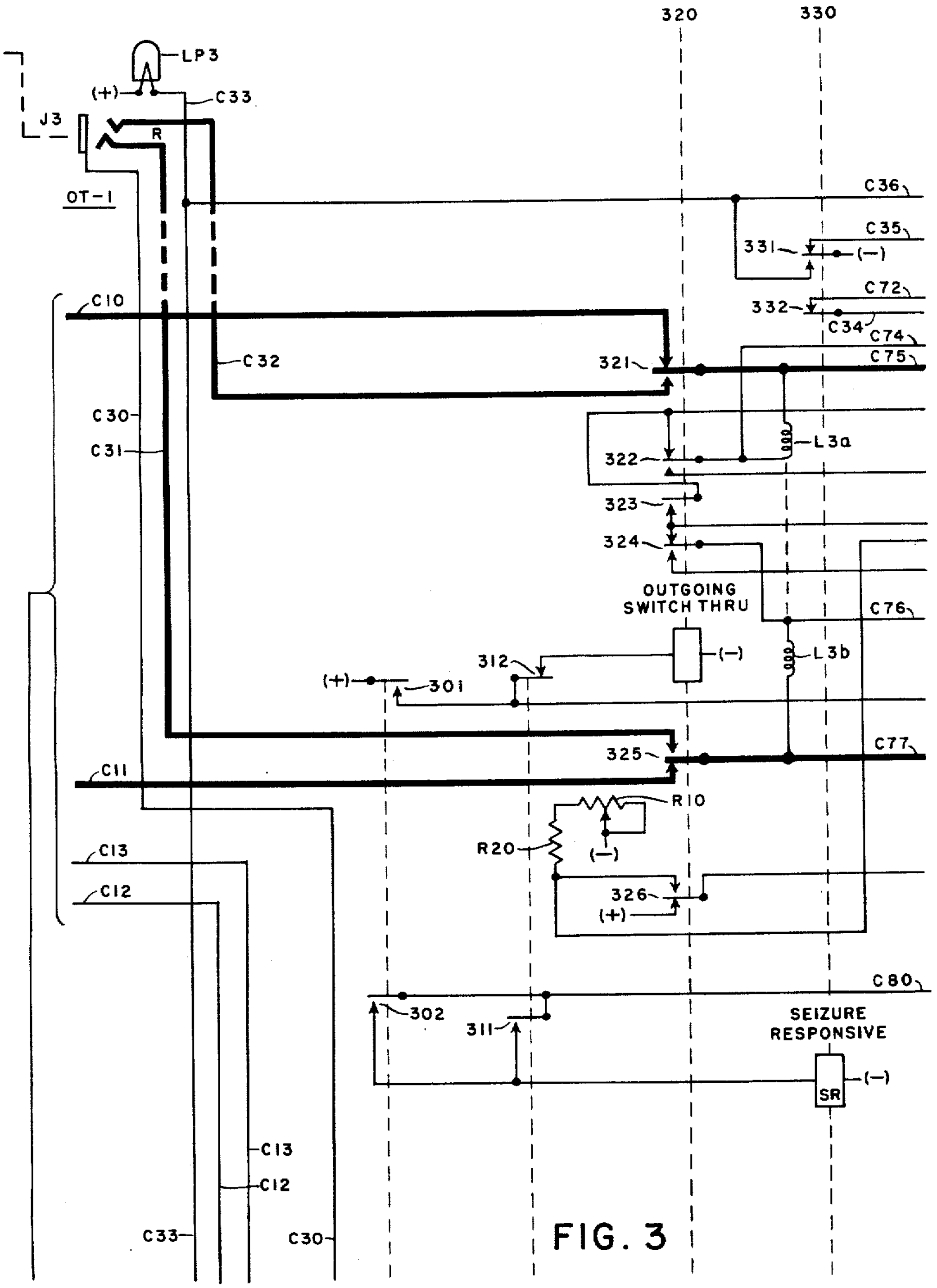
Figs. 3–9 show trunk termination TT–1. In addition.
Figure 4:
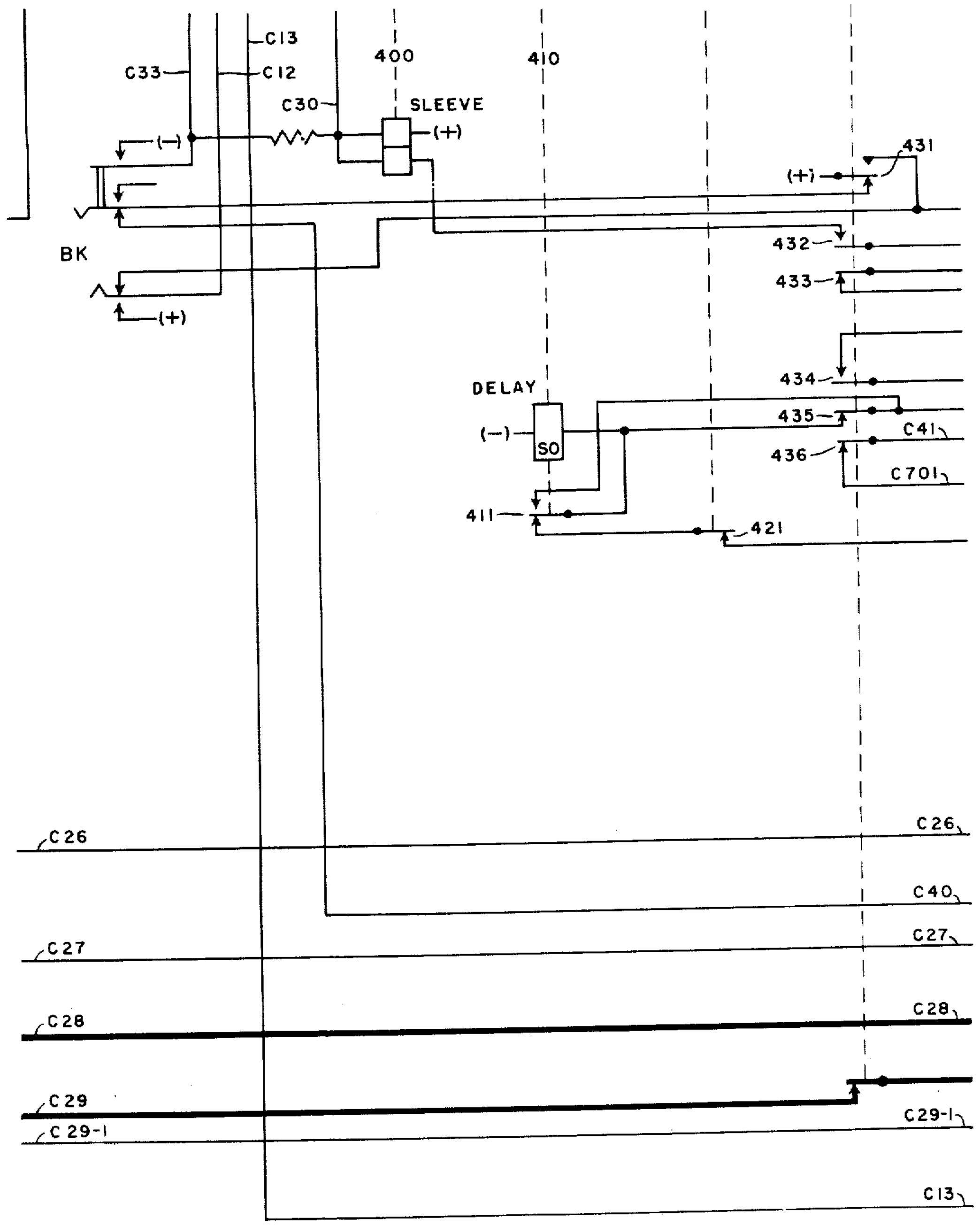
Figure 5:
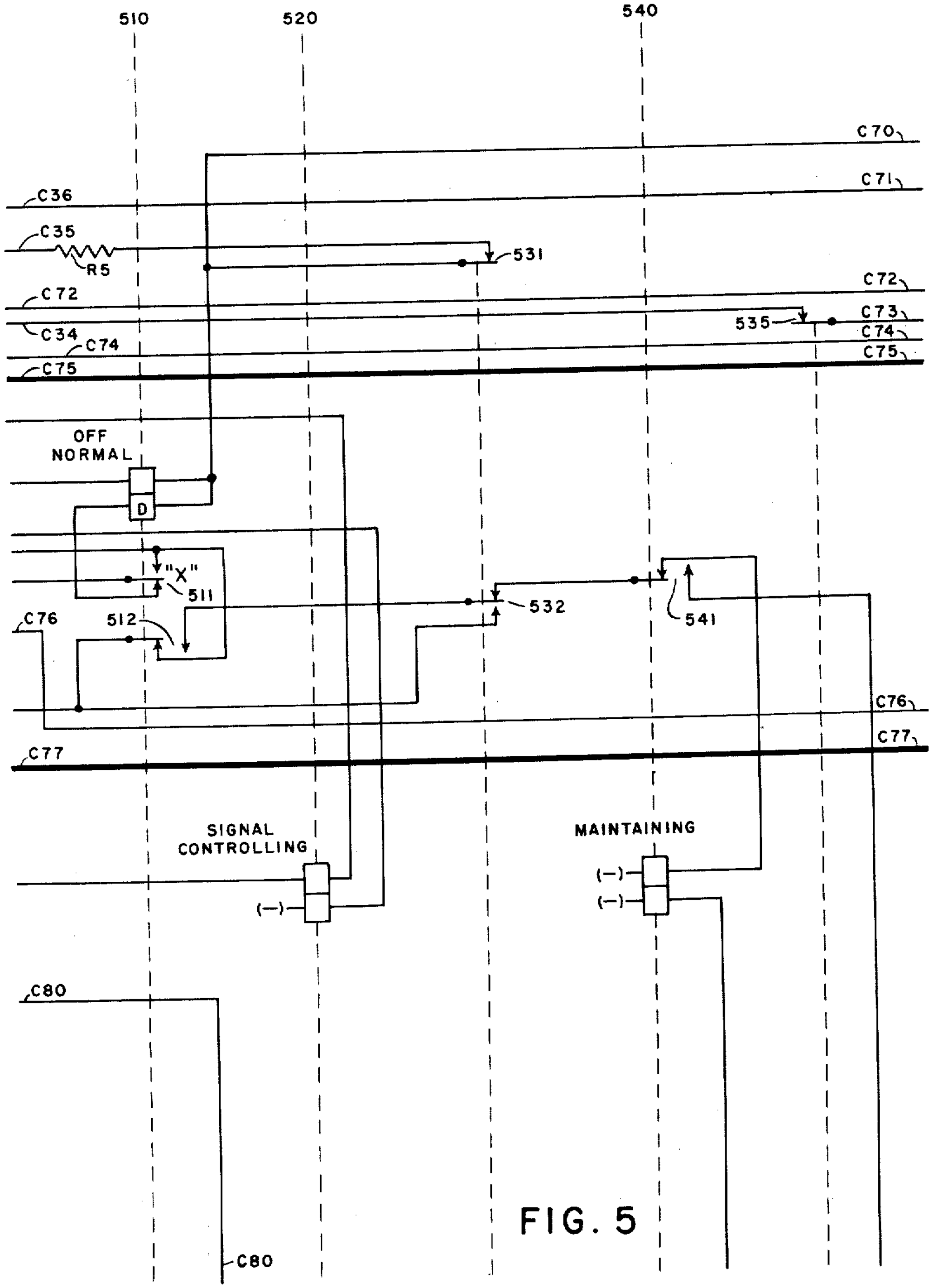

Referring to Fig. 14, a brief description of the telephone system is next given. First and second offices, B and C, are connected by any suitable two-way trunk TWT which is connectable by means of terminations TT–1 and TT–2 to other equipment in offices B and C, respectively. An incoming trunk IT–1 is used to extend calls from a third office A (not shown) to office B. Trunk IT–1 is terminated in repeater RP–1 and incoming selector IS–1. Calls from office A may be routed through selector IS–1 to a first point of access in termination TT–1 and thence to trunk TWT and termination TT–2 in office C. A call extended to termination TT–2 may be extended by means of incoming selector IS–2 which is associated with termination TT–2 to either an incoming trunk IT–2 or to a subscriber's telephone ST–2 by way of connector CNR–2. Selectors IS–1 and IS–2 and connector CNR–2 may be of the well known step-by-step type.

In office B, an operator's position OP has access to termination TT–1 from a second point; apparatus in position OP may be used to seize termination TT–1 to extend calls from operator's position OP to office C by way of termination TT–1, trunk TWT, and termination TT–2 at office C. Such calls may be extended to trunk IT–2 or subscriber's telephone ST–2, as above described.

Calls from office C into office B may be extended by way of outgoing trunk OT–2 into termination TT–2, thence to trunk TWT, termination TT–1 in office B, to incoming selector IS–3. Incoming selector IS–3 may be of the well known step-by-step type and is operative responsive to directive signals from the originating apparatus in office C to select any of a number of terminations such as connector CNR–1, which may then be directed in a similar manner to extend the connection to subscriber's telephone ST in office B.

The apparatus in the description which follows is designed to operate from batteries in each of offices B and C having a nominal potential of 48 volts. The most positive plate of each battery is conventionally connected to ground and connection to this terminal are referred to in the following description as "ground" and symbolically as (+). Similarly, connections to the most negative ungrounded plate are referred to as "battery" and symbolically as (−).

*Extension of call from office A to office C.*—To originate a call in office A (not shown), trunk IT–1 is seized at office A in the well known manner by placing a short between the conductors of the trunk, thereby completing a loop comprising a connection from ground, through the upper winding of relay 110, the break portion of transfer contacts 101, conductor C14 to the office A, the previously mentioned short, conductor C15, the break portion of transfer contacts 102, and the lower winding of relay 110 to battery. Relay 110 operates to close contacts 111 in repeater RP–1 to cause means in selector IS–1, not shown, to seize thte selector. Directive signals comprising impulses caused by repeated opening and closing of the short in the above described loop at office A cause relay 110 to follow the impulses and to repeat them at contacts 111 thereby causing selector IS–1 to be stepped in the well known manner in its primary direction to any one of a number of levels, such as the one in which conductors C10–C13 are terminated. Following the selection of a particular level, other means in the selector IS–1 then causes the switch to hunt in its secondary direction for an idle set of terminals. The exact methods by which the above operations are accomplished are not described in detail since they are well known in the art and since they are immaterial to this invention.

Assuming that incoming selector IS–1 has been directed and caused to hunt until it has reached the terminals to which conductors C10–C13 are connected and, further, that the switch has conducted a busy test in the well known manner and has found the terminals to be idle, a circuit (not shown) is completed to operate relay 130. Operation of relay 130 extends at make contacts 131 and 132 a connection from office A by way of blocking capacitors C1 and C2 to conductors C10 and C11, respectively, of termination TT–1. Operation of relay 130 is also effective to seize trunk termination TT–1 by completing a loop connection into signal controlling relay 520 as follows: ground at the break portion of contact 326 of relay 320, the upper winding of relay 520, the break portion of contact 322 on relay 320, the upper winding L3*a* of an inductance coil, the break portion of contact 321 on relay 320, conductor C10, wiper T of selector IS–1, the make contacts 131 on relay 130, contacts 111 on relay 110, the winding of impedance coil 120, the make contacts 132 on relay 130, wiper R, conductor C11, the break portion of contacts 325 on relay 320, the lower winding L3*b* of the inductance coil, the break portion of contact 324, the lower winding of relay 520 to battery. Relay 520 thereupon operates.

Figure 6:
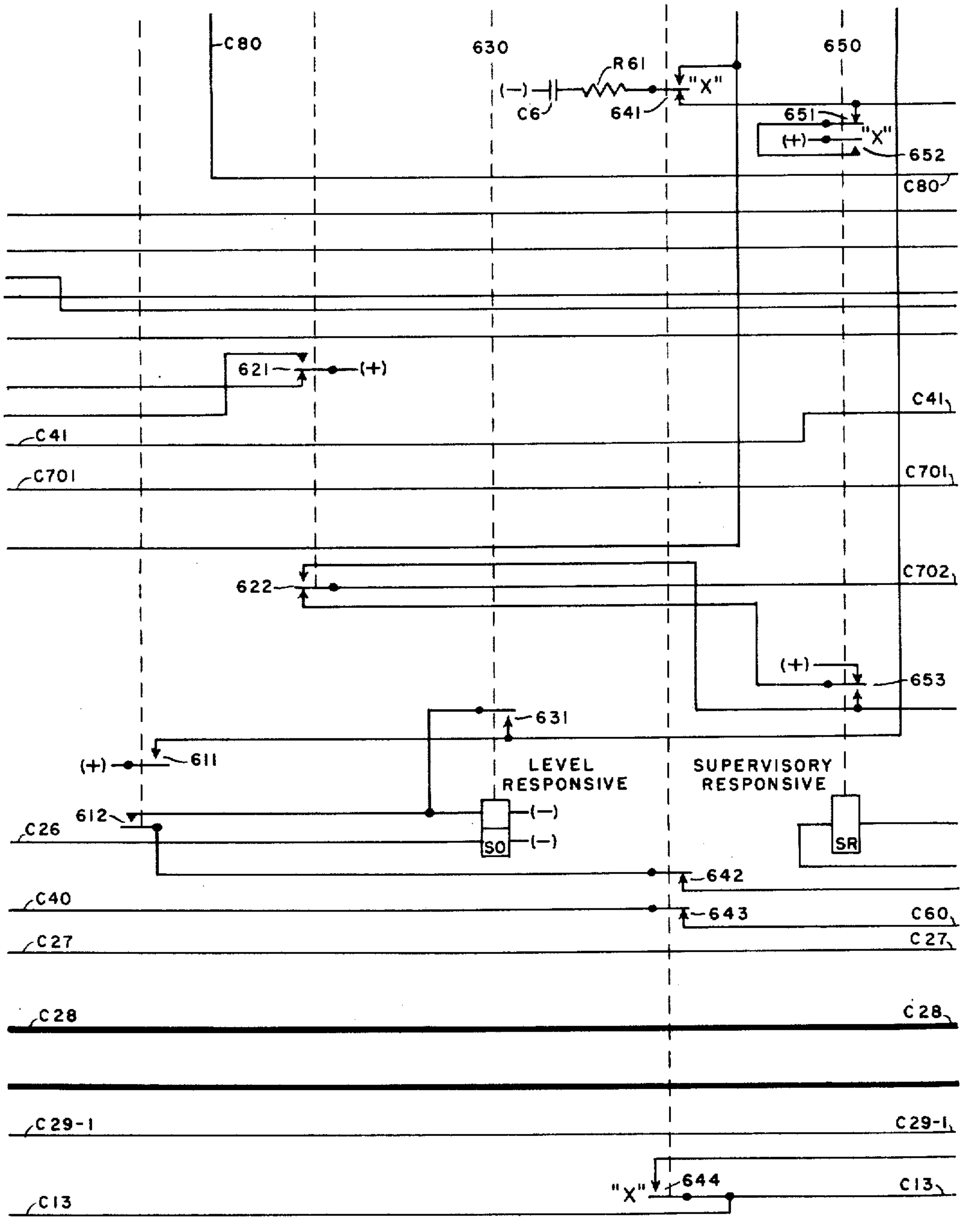
Figure 7:
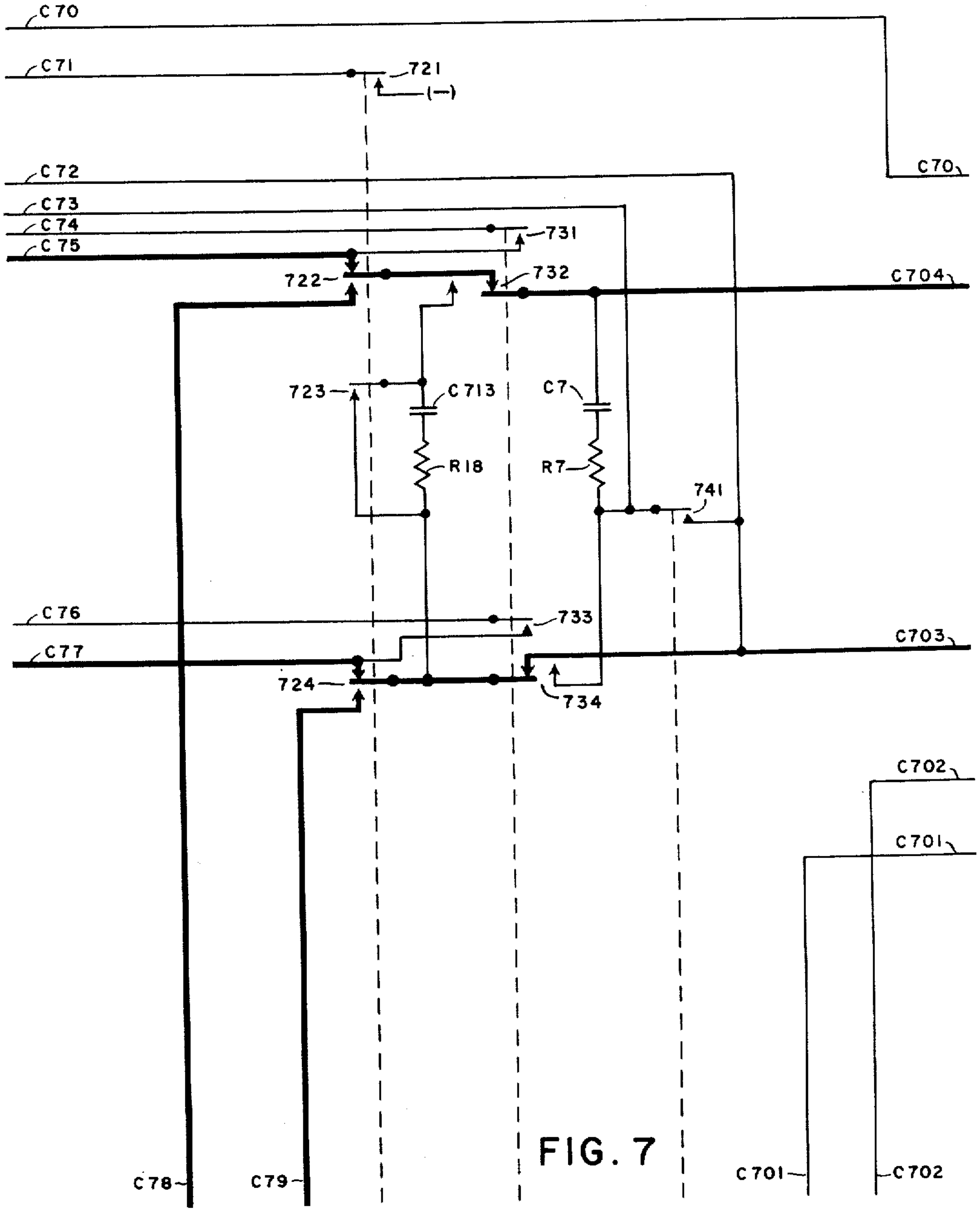
Figure 8:
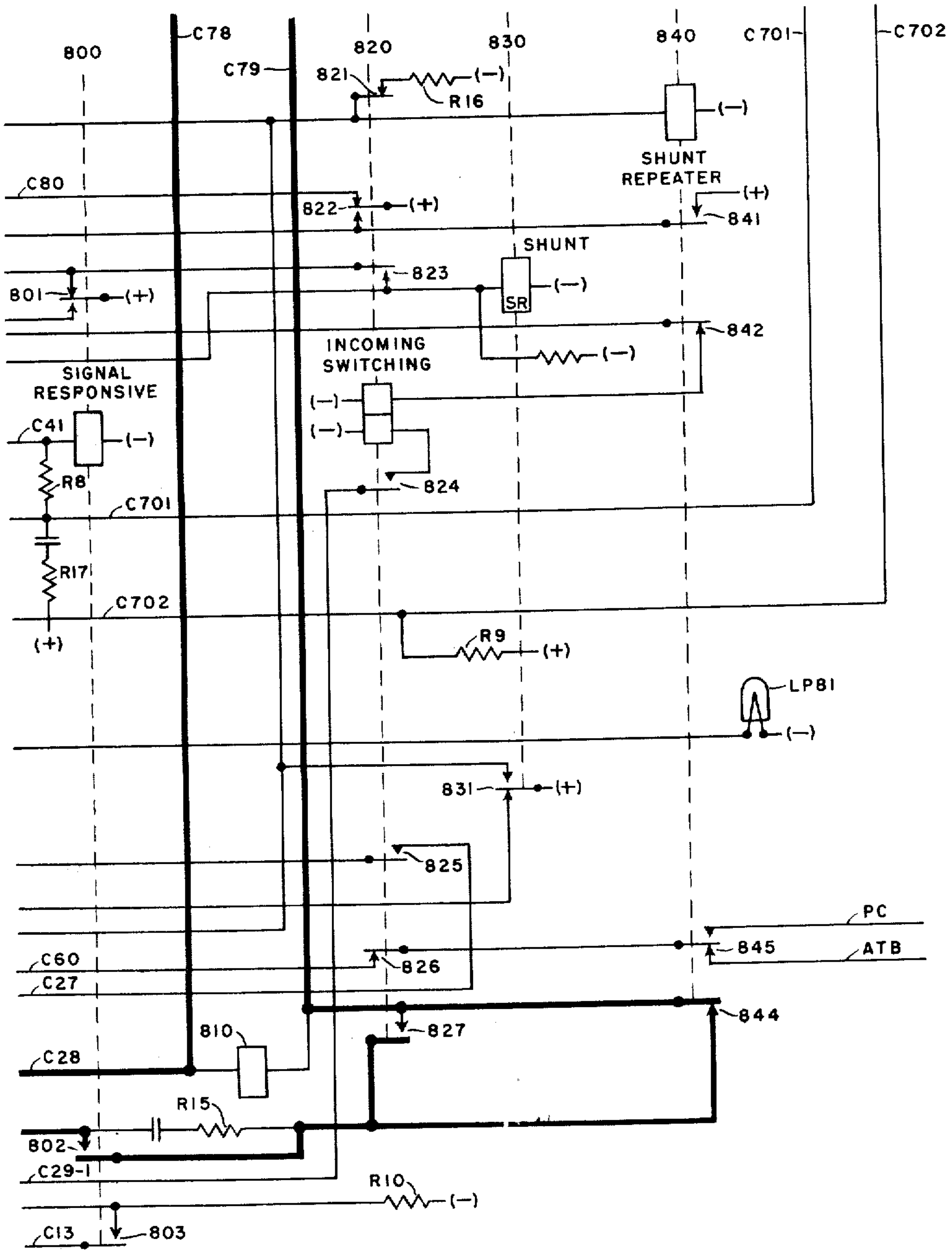

Operation of signal controlling relay 520 effects the seizure of trunk TWT and termination TT–2 in office C by transferring signaling conductor C702 from its normal connection to ground (in Fig. 6) by way of the break portion of contacts 622 and the break portion of contacts 653, to battery by way of the make portion of contacts 622 and resistance lamp LP8 thereby causing the differential duplex signaling and supervisory relay in trunk TT–2 which corresponds to relay 920 in trunk TT–1 to operate. Supervisory relay 920 in office B remains unoperated at this time.

Operation of relay 520 also initiates seizure of termination TT–1 by extending ground from the make portion of contacts 621 by way of break contacts 435 to the winding of relay 410 to energize the latter relay. Relay 410, being slow to operate as by the presence of a copper slug on its core, remains energized but unoperated for a sufficient time to allow relay 540 to operate.

Previous to the operation of relay 410, a circuit is completed for energizing relay 540 over the following circuit: ground at the make portion of contact 621, break contact 435, the break portion of contacts 411 on relay 410, break contact 421 to the lower winding of relay 540.

When relay 540 operates, preliminary make contact 641 closes to allow capacitor C6 to charge through resistor R6 from the source of ground used to energize the winding of relay 540 to delay the release of relay 540 after its energizing circuit is opened. Operation of relay 540 completes an operating circuit for supervisory relay 100 over the following circuit: battery, resistor R10, preliminary make contacts 644 on relay 540, conductor C13, wiper HS of incoming selector IS–1 and make contact 134 on relay 130, to the winding of relay 100 in repeater RP–1. Operation of relay 100 sends back a supervisory signal to office A by reversing the flow of current over trunk IT–1 in the well known manner. Operation of contacts 541, 642 and 643 on relay 540 is without effect at this time.

Following the above described operation of relay 540, relay 410 operates and completes an obvious locking circuit for itself at the make portion contacts of 411 that is independent of the operation of break contacts 435 on seizure responsive relay 330.

Operation of relay 410 is effective to open at the break portion of contacts 411 the above described energizing circuit for relay 540. The release of the latter relay is delayed for the interval required to discharge capacitor C6 through the lower winding of relay 540. Thus relay 540 is operated and released on seizure of the termination by the incoming selector IS–1; the operation and release of relay 540 is effective to send back to momentary supervisory signal over the incoming trunk IT–1 to office A. The duration of the supervisory signal is equal to the sum of the operate time of seizure responsive relay 410 and the release time of relay 540. Capacitor C6 which determines the release time of relay 540 is chosen so that the supervisory signal is of sufficient length to allow seizure responsive means in termination TT–2 in office C to seize and prepare for receiving directive signals for directing incoming selector IS–2.

Returning to consideration of relay 410, operation of relay 410 also completes at make contacts 311 a circuit for the operation of seizure responsive relay 330 from ground at break contacts 822, through conductor C80, make contact 311, and the winding of relay 330 to battery. Relay 330 thereupon operates.

I accomplish these objects by providing, in a termination for a two-way trunk, a normally operated pad controlling relay for causing the transmission level pad associated with the termination to be rendered effective, a relay operative responsive to seizure of the termination from either of two points of access on outward calls and a relay operative responsive to section of any one of a particular group of levels by the incoming selector switch associated on inward calls, operation of either the seizure responsive relay or the level responsive relay being effective to release the pad controlling relay to render the transmission pad ineffective. The level responsive relay is further arranged to be operative responsive to rering signals on calls from one of the outward access points to cause the outward signal controlling means to send a timed signal over the trunk to the office at the remote end of the trunk.

Operation of seizure responsive relay 330 is effective to complete the seizure of termination TT–1 by closing at the make portions of contacts 431 of relay 330 a ground connection by way of the break portion of the transfer contacts on busy key BK to conductors C12, to guard termination TT–1 against seizure by another incoming selector. Repeater RP–1 and selector IS–1 are held in seized condition by virtue of ground from the same source extended at wiper S of the incoming selector IS–1 to the winding of relay 130 and the winding of relay 140 by way of make contacts 133 on relay 130.

Operation of seizure responsive relay 330 is also effective at the break portion of contact 331 to open the normal operating path of relay 900 comprising the break portion of contacts 331, resistance R5, break contact 531, conductor C70 and the winding of pad controlling relay 900. Relay 900 thereupon releases, the effect of the release being explained later in this description. Operation of relay 330 completes a circuit for energizing the busy lamp LP8 at position OP at the make portion of contact 331 by way of conductor C36 to indicate to the attendant at the position that the trunk is in use.

Operation of relay 330 is further effective: to open a first path for placing the artificial line termination comprising capacitor C7 in series with resistor R7 across conductors 703 and 704 of the termination TT–1 at break contacts 332; to open the previously described operating circuit of relay 410 at break contacts 435; to prepare an operating circuit for shunt relay 830 at make contacts 434; to open the operate circuit of the incoming switching relay 820 at break contacts 433; to remove, at the break portions of contacts 431, ground from the all-trunks-busy lead, ATB; and to open at break contacts 436 a path shunt comprising conductors C41, the break contacts 436 and conductors C701 around resistor R8, so that the operate winding of relay 800 is placed in series with resistor R8 which in turn is connected to conductors C701. The operation of relay contacts 432 is without effect at this time.

As previously pointed out, operation of seizure responsive relay 330 is effective to release relay 900 by opening the latter's operating path at contact 331. Normally operated pad controlling relay 900 completes an obvious operating circuit for slave relay 910. Operation of relay 910 is effective to maintain the transmission pad comprising resistors R21—R26 and capacitor C901 effective to limit the transmission level on trunk TWT when the termination TT–1 is in normal condition. Release of relay 900 therefore is effective to render the transmission pad ineffective by releasing relay 910, a slow release type. The release of relay 910 is effective to render the pad ineffective by shorting out the leg members at contacts 911 and 913 and opening the cross member of the transmission limiting H pad at contacts 912.

As previously mentioned, operation of signal controlling relay 520 is effective to transfer conductor C702 from its connection to ground at the break portion of contact 653 to battery through the lamp LP8. Such a transfer is effective to cause the operation of the signaling relay in termination TT–2 corresponding to relay 920 at office C in the well known manner over the simplex signaling circuit comprising the upper winding of signaling relay 920, the trunk side of repeating coil RPT–9, the path derived from the parallel conductors of trunk TWT, and corresponding repeating coil and supervisory relay winding at office C to ground. Operation of the supervisory relay in office C is effective to seize termination TT–2 and to seize and prepare incoming selector IS–2 to receive directive signals from office B. Relay 920 does not operate at this time since no supervisory signal from office C has been sent back to office B over the above described simplex signaling circuit. The subsequent operation of termination TT–2 and other equipment in office C is completely conventional and well known in the telephone art. It is not necessary to explain the operation in other than general terms of these components here because they do not form a part of the present invention.

After the previously described seizure operation has taken place and the delay supervisory signal has been sent back to the switching equipment in office A, the termination TT–1 is in condition to repeat directive signals comprising a plurality of series of impulses caused by repeated opening and closing of the previously mentioned short across conductors C14 and C15 at office A. Such impulses are repeated by line relay 110 of repeater RP–1 to open and close the previously described loop which includes signal controlling relay 520 which follows the repeated impulses.

Relay 520, by following the repeated impulses, controls the repetition of signals to office C by transferring conductor C702 from the previously described battery connection to ground connection, one transfer for each impulse. These impulses on conductor C702 are received by the signaling relay corresponding to relay 920 in office C in termination TT–2, which repeats them into the succeeding equipment including incoming selector IS–2 thereby causing the selector and connector switches in office C to be stepped to the positions indicated by the number of impulses in each train of signals received. In selector IS–2, two representative levels are shown, one being used to terminate a plurality of incoming trunks such as IT–2, another level being used to terminate a plurality of connector circuits such as CNR–2.

Assuming that incoming selector IS–2 has been directed and caused to hunt to select an idle connector, further directive signals repeated by termination TT–1 are transmitted to the connector by way of incoming selector IS–2 to direct connector CNR–2 to seize a subscriber's line such as ST–2 thereby to extend a connection from termination TT–2 (to which the calling line in office A has been extended as previously described) to the subscriber ST–2. The connector is operative on seizure to automatically signal the subscriber in the well known manner. Following the answering operation by the subscriber at telephone ST–2, the connector repeats supervision backward to trunk termination TT–2 in the well known manner. In termination TT–2 supervision repeating means is operative to transfer the conductor which corresponds to C702 from its normal connection to ground to a connection to battery. This reversal of polarity on the signaling conductor at office C is effective to operate signaling relay 920 in office B.

Supervision from office C is repeated at office B in the following manner. Operation of signaling relay 920 applies ground at contacts 921 to conductor 701, series resistor R8, the winding of relay 800 to battery. Relay 800 is thereby operated to extend a connection from battery from resistor R10 to make contact 803 of relay 800 to C13 which in turn is extended over the previously described circuit to the winding of relay 100 in repeater RP–1 to signal office A by reversing the direction of current flow to office A as previously described.

Assuming that incoming selector IS–2 has been directed and caused to hunt for an idle trunk such as IT–2, selector IS–2 seizes the trunk, extends a connection from termination TT–2 in the same manner as in the case of seizure of connector CNR–2, to cause an incoming signal such as LP9 to be energized to signal an attendant at office C. Responsive to the attendant's answering the call, supervision is repeated backward through terminations TT–2 and TT–1 to office A in the same manner as in the case of connector CNR–2.

Returning to the pulse repeating operation in termination TT–1, responsive to the first opening of the loop in which signal controlling relay 520 is included, relay 520 releases to complete at the break portion of contacts 621 the previously prepared operating circuit for shunt relay 830. Relay 830 thereupon operates and holds up from pulsed ground supplied through the operating circuit during the remainder of the impulses of the train, relay 830 being slow-release type. Operation of shunt relay 830 is effective to close a short around windings **L3*a* and L3*b* of the inductance coil at make contacts 731 and 733, respectively, thereby to remove the inductance from the operating loop of relay 520. In addition, operation of relay 830 prepares a circuit for operating level responsive relay 630 and completes a circuit for operating shunt repeater relay 840 at the make portion of contacts 831. Operation of shunt relay 830 is effective to split the above described connection extended from office A to trunk TWT at the break portions of make-before-break contacts 732 and 734, and to terminate each of the resulting ends in an artificial line termination comprising capacitor C713 and resistor R18 and a termination comprising capacitor C7 and resistor R7 at the make portions of contacts 732 and 734**, respectively.

Operation of shunt repeater relay 840 responsive to operation of relay 830 places ground at contacts 841 on conductor C12 by way of break contacts on busy key BK to indicate to switches testing shunt TT–1 that the switch is in use for reasons that are brought out later. In addition, operation of relay 840 prepares a circuit at the make portion of contact 843 for energizing the peg count lead PC and completes at contact 711 a connection of the artificial line termination comprising capacitor C7 and resistor R7 and conductors C704 and C703 which are in effect across the line conductors C90 and C91 of trunk TWT.

Following the receipt of the last impulse in each train of impulses, signal controlling relay 520 comes to rest in its operated position so that the operating and holding circuit for shunt relay 830 is opened for a time sufficient to allow relay 830 to release. Release of relay 830 opens the operating circuit of shunt repeater relay 840 which thereupon releases. Release of relay 840 is delayed following its de-energization.

Release of relays 830 and 840 is effective to reconnect office A to the trunk TWT at the break portions of make-before-break contacts 732 and 734; to remove the artificial line termination from the ends of the split connection at the now-open portion of the latter contacts; and to reinsert the windings L3*a* and L3*b* of the inductance in series with the operating loop of signal controlling relay 520.

When the above described connection from office A through to office C has been completed and is to be released, the release is originated at office A by opening the loop of incoming trunk IT–1. Opening of the loop of trunk IT–1 releases line relay 100 of repeater RP–1 which in turn opens the previously described loop of the signal controlling relay 520 at contacts 111. The resulting release of signal control relay 520 is operative to transfer conductor C702 from its previously described connection to battery to its normal connection to ground by way of the break portion of contacts 653, and thereby releases the signaling relay at office C which corresponds to relay 920 in office B. Release of the signaling relay at termination TT–2 is operative to release the succeeding switching equipment such as connector CNR–2 and incoming selector IS–2. Following the release of the switching equipment, a normal, on-hook supervisory signal is returned by the switching equipment in office C to termination TT–1 to cause the latter to release signal responsive relay 800 to remove the battery source at contacts 803 from conductor C13 thereby releasing supervisory relay 100 to signal office A. Release of relay 520 is also effective to open the locking circuit of relay 410 which thereupon releases. Release of relay 410 is effective to open the operating circuit of seizure responsive relay 320 at contacts 311 to release relay 320.

Responsive to the release of signal controlling relay 520, a circuit is completed at the break portion of contacts 621 and the make contacts 434 of relay 330 to reoperate shunt relay 830 which in turn energizes shunt repeater relay 840 as previously described. Responsive to the reoperation of shunt repeater relay 840 and the release of seizure responsive relay 330, a circuit to the peg count lead PC is completed from ground at the break portions of contacts 431, busy key BK, 643, and 826 to energize a peg count meter, not shown, common to a group of terminations such as TT–1. Energization of the meter causes the latter to record the use of the trunk.

Release of seizure responsive relay 330 is effective to remove ground from conductor C12 at contacts 431 which has been effective to hold relays 130 and 140 in incoming selector IS–1 and repeater RP–1, respectively. However, the reoperation of shunt repeater relay 840 is effective to hold the latter relays operated until termination TT–1 has fully released by establishing at contacts 841 a ground to conductor C12.

Responsive to the release of seizure responsive relay 330, the operating circuit of shunt relay 830 is opened to release the latter relay. Release of the latter effects the release of shunt repeater relay 840 to remove the above mentioned ground from conductor C12. At this point all relays in the termination TT–1 are restored to normal and the circuit is in condition for further use. Relays 130 and 140 thereupon release to release selector IS–1 and repeater RP–1, respectively, in the well known manner.

*A call extended from the toll board of office B to office C.*—The attendant position OP, after observing that busy lamp LP3 is not lighted, which indicates that trunk TWT is not in use, seizes termination TT–1 by means of the cord circuit shown in Fig. 11. Insertion of the plug P12 into jack J3 completes an operating circuit for sleeve relay 400 from a source of battery at the winding of sleeve relay 1130, the sleeve conductors of the plug P12 and jack J3, conductor C30 to the high resistance upper winding of sleeve relay 400. Current flowing in the latter circuit is sufficient to operate relay 400, but insufficient to operate relay 1130.

Responsive to operation of sleeve relay 400, a circuit for operating seizure responsive relay 330 is completed from battery, the winding of relay 330, make contacts 302 of sleeve relay 400 by way of conductors C80 and the break portion of contacts 822 on the incoming switching relay 820 to ground. Also responsive to operation of relay 400, an operating circuit for the outgoing switchthrough relay 320 is completed at make contacts 301 by way of break contacts 312 on delay relay 410, the winding of relay 320 to battery. Insertion of plug P12 into jack J3 and the operation of outgoing switchthrough relay 320 effects the extension of a connection from the tip and ring conductors of the cord circuit to the conductors of the two-way trunk and effects the disconnection of conductors C10 and C11 from conductors C90 and C91 at transfer contacts 321 and 325, respectively.

Operation of relay 330 completes a circuit for operating supervisory relay 1130 in the cord circuit from ground at the break portion of contact 801, make contact 432, the lower, low resistance, winding to the above described connection to relay 1130 in the cord circuit. The associated supervision indicating equipment comprising lamp LP11 is energized by the resulting operation of relay 1130 to indicate that termination TT–1 is in condition to receive directive signals from the cord circuit in position OP.

Operation of relay 330 is effective to render the transmission pad ineffective by opening the operating circuit of pad controlling relay 900 at the break portion of contacts 331 and to indicate to all attendants at the switchboard that the termination TT–1 has been seized by energizing the busy lamp LP3 at the make portions of contacts 331 as has been previously explained. Also as previously explained, operation of relay 330 removes the artificial line termination comprising capacitor C2 and resistor R7 at break contact 332; prevents seizure of termination TT–1 by an incoming selector such as IS–1 by extending guarding ground to the conductors C12 at make portions of contact 431 by way of break contact on busy key BK; prepares an operating circuit for shunt relay 830 at contacts 434; and inserts resistor R8 in series with the operate winding of signal responsive relay 800 by removing the shunt comprising break contacts 436 from around the resistor.

Operation of relay 320 is effective to complete an energizing circuit for signal controlling relay 520 over the following circuit: ground, make contact 301 on sleeve relay 400, the break portion of make-before-break contact 512, the make portion of transfer contact 326, the upper winding of relay 520, make contacts 323, the lower winding of relay 520 to battery. Relay 520 operates to seize trunk TWT and to prepare termination TT–2 to receive switch controlling signals, as previously described, by transferring conductor C702 from its normal connection to ground to a connection to battery through resistance lamp LP8.

Unlike the case of seizure of termination TT–1 from repeater RP–1, when the termination is seized from operator position OP, delay relay 410 is not energized because its operating circuit is not completed, seizure responsive relay 330 having been operated previous to the operation of signal responsive relay.

The attendant, by means not shown, at position OP connects dial D11 to the cord circuit by causing contacts 1121 and 1122 to be operated, thereby transferring the tip and ring conductors of the cord circuit which are connected to plug P12 into the dialing equipment. At contact 1122, ground from pulsing contacts D112 of a signaling device comprising dial D11 is placed on the ring conductor of the cord circuit which is extended to conductor C31 of trunk TT–1 and through the lower winding of inductance L3 to the make portion of contact 324 of relay 320, the break portion of the preliminary contact 511 to the lower winding of off-normal relay 510, to the winding of pad controlling relay 900 thereby shorting out the lower winding of relay 900.

When the attendant at position OP moves the dial D11 off-normal in preparation for dialing into office C, off-normal contacts D111 operate to extend ground to the operating winding of relay 1110 which locks up to ground connected to its own winding through contacts 1112. Operation of relay 1110 extends resistance battery from resistor R27 through make contacts 1111, the make portion of contacts 1121 to the tip conductor of plug P12, the tip conductor of jack J3, conductors C32, the make portion of contacts 321 of relay 320, the upper winding of inductance L3, the make portion of contact 322, the upper winding of relay ON, to the grounded winding of pad controlling relay 900. Off-normal relay 510 thereupon operates.

Operation of off-normal relay 510 is effective at preliminary contacts 511 to transfer the ground from pulsing contacts D112 of dial D11 from the previously described connection to the lower winding of relay 510 to a connection to signal controlling relay 520 over the make portion of contacts 326 to the upper winding of relay 520, thereby providing a circuit for holding relay 520 operated. When the off-normal relay 510 has become fully operated, the operating circuit of signal controlling relay 520 is opened at the break portion of the make-before-break contacts 512 so that signal controlling relay 520 is held operated from ground supplied through pulsing contacts D112. Operation of relay 510 is further effective at the make portion of the make-before-break contacts 512 to operate relay 540 over the following circuit: from the same source of ground at the pulsing contacts D112 in the cord circuit extended to the make portion of contacts 512, the break portion of contacts 532 of pad controlling relay 630, the break portion of the make-before-break contacts 541 on relay 540, to the upper winding of relay 540 to battery. Relay 540 thereupon operates and locks up through the make portion of make-before-break contacts 541 to ground at contacts 611 on off-normal relays 510.

Operation of relay 540 at this time is effective to prevent the completion of an operating circuit for level responsive relay 630 which has been prepared at make contacts 612 on off-normal relay 510. Operation of relay 540 opens the previously described path between ATB conductor and PC conductor C60, and conductor C40 at break contacts 643. Operation of make contact 644 and transfer contact 641 on relay 540 is without effect at this time.

Release of dial D11 by the operator is effective to cause the pulsing contacts D112 to interrupt the holding circuit of signal controlling relay 540. On each opening of contacts D112, signal controlling relay 520 is released to send a corresponding directive pulse into office C over the previously described signaling circuit by transferring conductor C702 from its connection to battery by way of lamp LP8 to a connection to ground at the break portion of contacts 653. Release of the signal controlling relay in response to the first impulse is also operative to complete a circuit for operating shunt relay 830 at the break portion of contacts 621 and make contacts 434 on seizure responsive relay 430. Shunt relay 830 thereupon operates and, being the slow release type, is held operated over the transmission of the entire series of impulses.

Operation of shunt relay 830 is effective in the manner previously described: to short out windings L3*a* and L3*b* of the inductance coil, which have been in series with pulsing circuit of relay 520; to open a connection between the two-way trunk TWT and the trunk termination TT–1; to complete circuits for first artificial line termination comprising of capacitor C113 and resistor R18 between the conductors of the trunk termination TT–1 which have been connected to the tip and ring conductors and the cord circuit, and artificial line termination comprising of capacitor C7 and resistor R7 between the conductors C703 and C704 of the trunk termination TT–1; and to complete an operating circuit for shunt repeater relay 840.

Operation of relay 840 is effective in the manner previously described: to complete a second circuit for artificial line termination comprising capacitor C7 in series with resistor R7 between the conductors C703 and C704; and to extend at make contacts 841 a further guarding ground to the sleeve (test) conductor C12 to the bank of the incoming selector circuit to further guard the selector bank terminals against seizure from an incoming selector such as IS–1. Operation of the remainder of the contacts on shunt repeater relay 840, including break contacts 842 and 844 and transfer contacts 843, is without effect at this time.

When the dial has returned to its normal position, contacts D112 come to rest in make condition so that signal controlling relay 520 is held at its operated condition. Off-normal relay 1110 remains operated by means of its own locking contacts 1112 so that the resistance battery from resistor R20 in the cord circuit remains connected to the tip conductor of the cord circuit to hold off-normal relay 510 operated over the previously described operating circuit. Continued operation of off-normal relay 510 maintains signal controlling relay 520 operated under the control of pulsing contacts D112.

At the conclusion of a train of impulses the above described energizing circuit of shunt relay 830 is opened for a period of time sufficient to allow the shunt relay 830 to release thereby restoring the connection between the talking conductors of trunk TT–1 and trunk TWT and to open the paths by which the artificial line terminations were connected to the termination TT–1 and trunk TWT. Release of the shunt relay 830 also de-energizes shunt repeater relay 840 to further open the line termination of two-way trunk TWT and removes the previously mentioned auxiliary guarding ground from conductor C12.

Further operation of the dial by the attendant is effective to send out further trains of impulses over conductors C702 to the distant office C to direct the switching apparatus to select the line or trunk to which a connection is desired in the previously described manner. At the conclusion of dialing, the operator, by means not shown, releases transfer contacts 1121 and 1122 to their normal positions to re-establish connections between the tip and ring conductors connected to plug P12 and the tip and ring conductors, respectively, connected to plug P11. Further means associated with the dial releasing means is operative to release relay 1110 by opening the locking circuit at contacts 1111 to remove resistance battery from contacts 1121. At now normal contacts 1122, the connection of ground from pulsing contacts D112 is removed from the ring conductor. Responsive to the removal of the resistance battery connection from the tip conductor of the cord, off-normal relay 510 is released to re-establish the above described operating circuit of the signal control relay 520 and to re-establish the connection between the lower winding of off-normal relay 510 and the conductor C31 which in turn is connected to the ring conductor of contact J3. Release of relay 510 is also operative to open the above described locking circuit for maintaining relay 540 at contact 611.

Figure 9:
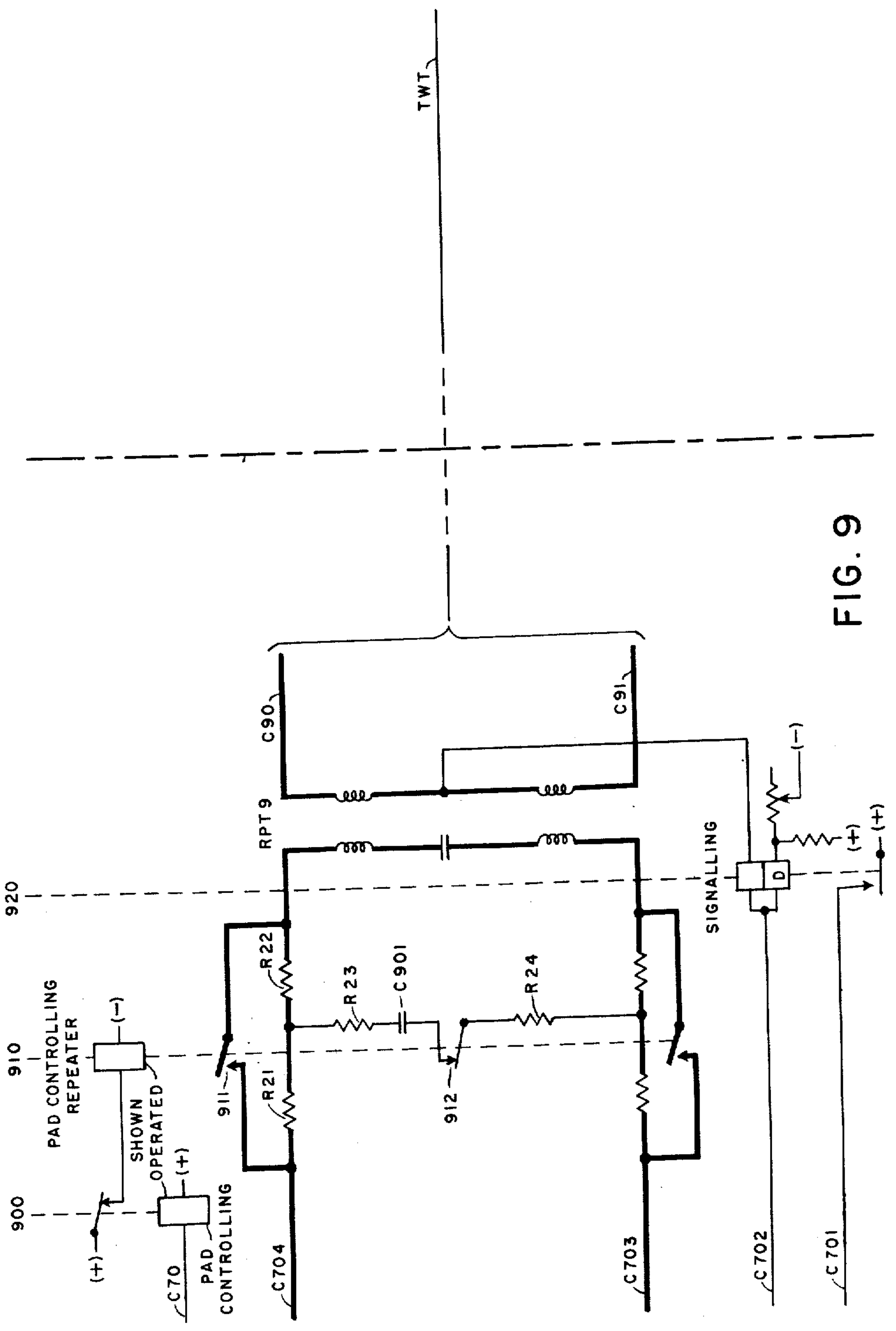
Figures 10, 15:
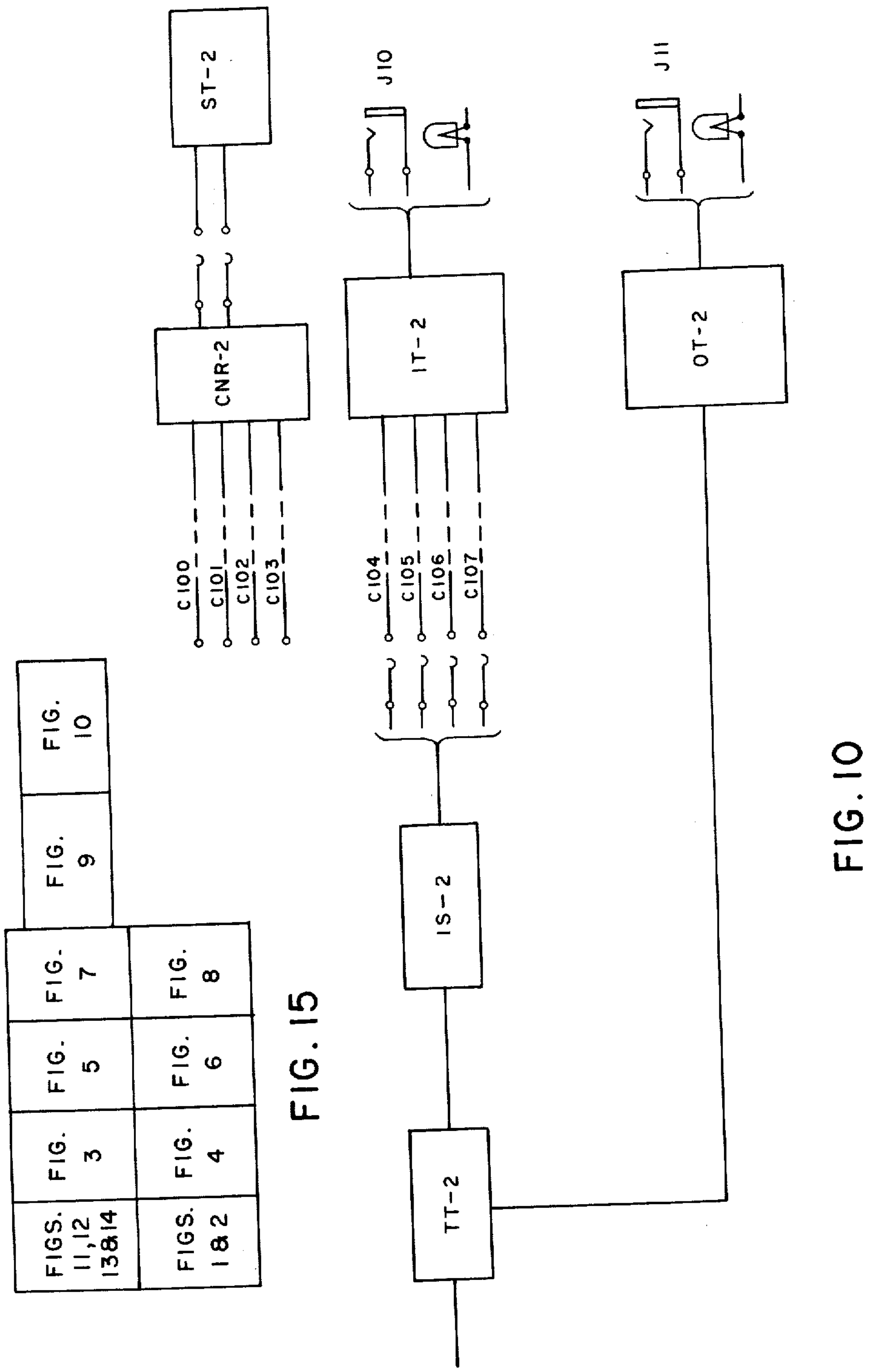
Fig. 10 shows the skeletonized arrangement of apparatus in office C including block diagrams of trunk termination TT–2, incoming selector IS–2, connector CNR–2, incoming trunk IT–2, outgoing trunk OT–2 and subscriber's telephone ST–2.

Thus far, a description has been made of a means comprising relay 330 which is operated responsive to seizure of termination TT–1 from either the switch train or position OP for controlling the operation of pad controlling means comprising relay 900, the latter controlling the insertion and removal of the transmission controlling pad shown in Fig. 9. An alternative method for controlling relay 900 from the seizing apparatus comprising the cord circuit in position OP is next considered. In the case of connections from lines terminating in position OP completed by way of termination TT–1, in connections from some classes of lines such as is shown in Fig. 13, the previously mentioned transmission pad is required to be effective, whereas, on connections from other classes of lines such as shown in Fig. 12, it is not. Accordingly, lines of the class which require that the pad be effective are arranged to supply battery from through high resistances to their tip and ring conductors; lines of the class which require that the pad be effective do not have such a battery supply. To achieve control of the pad controlling relay 900, patching means comprising the tip and ring conductors of the cord circuit are used to complete connections between the tip and ring conductors of the terminating conductors C31 and C32, respectively, of termination TT–1 by way of the windings of off-normal relay 510 for controlling the energization of pad controlling relay 900. Thus a connection patched up from a line such as that shown in Fig. 12 which requires that transmission pad be effective supplies battery over the above described circuit to operate pad relay 900. The windings of off-normal relay 510 are differentially connected with respect to current flowing through the branches of the circuit comprising resistors R12 and R13 to thereby prevent the operation of relay 510 at this time.

As previously explained, operation of relay 900 is effective to complete the operating circuit for slave relay 910 at contact 901. Operation of the slave relay is effective to remove the shorting conductors around the components in each of the legs of the H pad circuit at contacts 911 and 913 and to close the connection in the cross member of the H at contact 912 so that the pad is made effective to limit the level of transmission on the two-way trunk.

Should termination seizing means comprising a cord circuit in position OP be used to establish a connection between termination TT–1 and a terminated line of the class which does not require the transmission pad to be effective, such as is shown in Fig. 13, the absence of a battery source in the line circuit to be connected through the tip and ring conductors of the cord in the above outlined operating path of pad controlling relay 900 maintains the latter and slave relay 910 in unoperated condition so that the leg elements of the H pad are shorted out by contacts 911 and 913 and the cross member is opened at contact 912.

When the called line or trunk at office C is answered, supervisory means in trunk termination TT–2 is energized to transfer the signaling conductor corresponding to C702 from its normal connection to ground to a connection to resistance battery thereby causing signaling relay 920 in trunk termination TT–1 to operate. Operation of relay 920 is effective to operate supervisory responsive relay 800 in the manner previously described. Operation of relay 800 is effective to open the low resistance winding of sleeve relay 400 at contacts 801 and thereby decreases flow of current through the winding of relay 1130 in the cord circuit. Relay 1130 releases responsive to the decrease in current. Release of relay 1130 extinguishes supervisory lamp LP11 to indicate to the operator that the call has been answered by opening the lamp's energizing circuit at contacts 1131.

After a call has been set up between offices B and C, the attendant at position OP may send forward a rering signal comprising a timed pulse of 50 to 120 milliseconds duration to the office C equipment which is effective to resignal the terminating apparatus in office C, such as incoming trunk IT–2, without releasing the switch train comprising selector IS–1. To originate such a signal, the attendant at position OP cams key K11 to transfer the tip conductor of plug P12 from its normal connection to the tip conductor of plug P11 to battery through resistance R28 at the make portions of contacts on key K11. The resistance battery is connected to the upper winding of off-normal relay 510 by way of the tip spring of jack J3, conductor C32, through the upper winding of inductance coil L3, the make portions of contacts 622, the upper winding of off-normal relay 510, conductor C70 to the winding of pad controlling relay 900 to ground. Off-normal relay 510 thereupon operates.

Operation of off-normal relay 510 is effective at the break portions of make-before-break contacts 512 to open the above described operating circuit of signal controlling relay 520. Relay 520 thereupon releases. It is to be noted that transmission of the rering signal differs from the dialing operation in that in the rering operation, responsive to the operation of key K11, no ground connection is extended through the ring conductor of plug P12 so that the previously described operating circuit for relay 540 is not established. As a result, relay 540 does not operate at this time.

Release of relay 520 is effective at the break portions of contacts 622 to transfer the signaling conductors C702 from its connection through lamp LP8 to battery to its normal connection to ground from the break contacts 653 to start the timed signal to office C to the rering responsive equipment in office C. The latter equipment is not shown since it is well known in the telephone art and is not a part of the present invention. Release of signal controlling relay 520 is also effective at the break portions of contacts 621 to establish the previously described operating circuit for shunt relay 830 which thereupon operates.

An operating circuit for level responsive relay 630 is completed responsive to operation of shunt relay 830 and the released condition of relay 540 at the make portions of contacts 331, break contacts 642 of the make portions of contacts 612 to the upper winding of relay 630. Upon the operation of level responsive relay 630 over the above described circuit, a locking circuit comprising make contacts on off-normal relay 611 and the make contacts 631 is established to hold the level responsive relay operated so long as the key K11 and the off-normal relay in the cord circuit are held operated.

Operation of level responsive relay 630 is effective at the make portions of contacts 532 to close an alternate operating circuit for signal controlling relay 520 which thereupon reoperates to re-transfer at contacts 622, signaling conductor C702 from its connection to ground at the break portions of contacts 653 to battery through the ballast lamp LP8 at the make portion of the same contacts, thereby terminating the rering signal to office C. Reoperation of signal controlling relay 520 opens the break portion of contacts 621 to open the above described operating circuit for shunt relay 830 which thereupon releases to open the operating circuit for level responsive relay 630.

The interval of time during which signal controlling relay 520 remains in its released condition determines the length of the signal sent to the equipment in office C. This interval represents the sum of the intervals required to operate each of relays 830, 630 and 520. Level responsive relay 630, being of the slow operate type, chiefly determines the length of the interval.

The attendant at position OP releases key K11 at the conclusion of the signaling operation to open the above described operating circuit through off-normal relay 510. Relay 510 thereupon releases to open at contacts 611 the locking circuit for level responsive relay 630 which likewise releases. Owing to the overlapping nature of the make-before-break contacts 612 of off-normal relay 510, the original operating circuit for signal controlling relay 520 is re-established before the alternative operating circuit comprising contacts 512 for the same relay is opened by the release of level responsive relay 630. For this reason, relay 520 is held steadily operated during the release operation of key K11 so that no further signal is transmitted through the office C.

At the conclusion of the call, the attendant at position OP releases the connection by pulling down plug P12 from jack J3. The previously described operating circuit of sleeve relay 400 is opened to allow that relay to release. Release of sleeve relay 400 is effective to open at contacts 301 and 302 the operating circuit for outgoing switching relay 320 and seizure responsive relay 330, respectively, which thereupon release. Relay 320, which releases before the slow release type seizure responsive relay 330, is effective on its release to open the operating circuit of signal controlling relay 520 which thereupon releases. Responsive to the release of relay 520 and the continued operation of relay 330, the previously described circuit for operating shunt relay 830 is re-established to operate the latter momentarily. Operation of shunt relay 830 is effective to operate shunt repeater relay 840 which in turn extends an auxiliary busy ground marking to the conductors C12 of the selector banks to hold that termination busy to the incoming switch train for the time required for the equipment at office C.

The continued release of relay 520 constitutes a release signal sent to termination TT–2 in office C to cause that termination to in turn release the equipment at office C by transferring at contacts 622, conductor C702 from its connection to battery through ballast lamp LP8 to its connection to ground at break portions of contacts 653.

In summary, it is pointed out that signal controlling relay is operative responsive to seizure of termination TT–1 from the switch train comprising selector IS–1 and is in turn effective to bring about the operation of delay relay 540 over the latter's lower winding. Operation of relay 540 is effective to send back a supervisory signal to the incoming switch train and office A. Delay relay 410, arranged to be operated subsequent to the operation of relay 540 and responsive to the operation of signal controlling relay 520, is effective to release relay 540 to terminate the supervisory signal. When termination TT–2 has been seized from position OP, the same relay 540 is responsive to operation of the dialing means in position OP to hold signal controlling relay 520 in condition to repeat directive impulses from dial D11 to the equipment at office C.

*A call from distant office C to office B.*—In order to extend a call from office C, idle equipment at that office, such as outgoing trunk OT–2, is seized and is thereupon effective to seize termination TT–2 and trunk TWT. Termination TT–1 at the office B is thereupon seized and prepared for receiving directive impulses to operate its associated selector switch, IS–2, as is next described.

Responsive to seizure in termination TT–2, the signaling lead in office C corresponding to lead 702 in office B is transferred from its normal connection to ground to a connection to resistance battery to signal office B. In office B this signal is effective to operate signaling relay 920. Responsive to operation of relay 920, contacts 921 are closed to extend ground to conductor C701 through break contacts 436 on seizure responsive relay 330 to the operating winding of supervisory responsive relay 800. Relay 800 is thereby operated.

Operation of supervisory responsive relay 800 is effective to operate incoming switching relay 820 by extending ground from contacts 801 by way of break contacts 433 and 842 to the upper winding of relay 820. Operation of relay 800 is also effective to seize incoming selector IS–3 by establishing a calling loop into switch IS–3 comprising the grounded winding of relay 210, the break portions of contacts 213, conductor C28, impedance coil 810, the break contact 844 on relay 840, make contacts 802, signaling responsive relay 800, break contacts 437, conductor C29, the break portion of contacts 214, to the battery winding of relay 210. Relay 210 thereupon operates. The closing of contacts 803 on relay 800 is without effect at this time.

Responsive to seizure of the incoming selector IS-2 caused by the closing of the above described loop, ground is passed back in the well known manner over conductor C29–1, through the make contact 824, to the lower, locking winding of relay 820, to hold the latter relay operated independent of the previously described operating circuit.

Operation of relay 820 is effective to indicate to switches such as incoming selector IS–1 that termination TT–1 is in use by extending a ground to conductor C12 by way of the make portion of contacts 822, and the break contacts on busy key BK. At the make portion of contacts 823, a path for operating shunt relay 830 is prepared. In similar fashion, a path for operating the supervisory responsive relay 650 is prepared at contacts 825. The previously described circuit for energizing the all-trunks-busy conductor ATB and the peg count conductor PC is opened at contacts 826. At make contacts 827, a second means for completing the loop around break contacts 824 of the shunt repeater relay is completed to insure holding of the loop to incoming selector IS–3. At transfer contacts 722 and 724, conductors C703 and C704 are inductively coupled by means of repeat coil RPT9 to trunk TWT are transferred from their normal connections to the terminal banks to which selector such as IS–1 have access to the talking conductors which include the above described loop of incoming selector IS–3. A second shunt path is prepared at make contacts 723 of relay 820 for the dialing operation which is to be explained presently.

Switch directive signals comprising trains of impulses are sent from office C to office B in the form of repeated transfers of potential from battery to ground on the signaling conductor in office C which corresponds to C702 over the simplex path derived from conductors C90 and C91 to pulse signaling relay 920. Relay 920 repeats pulses at contacts 921 to conductor C701 to pulse the operate winding of signal responsive relay 800. Relay 800 in turn follows the repeated impulses to open and close at contacts 802 the previously described loop of the incoming selector IS–3. Contacts on relay 210 in selector IS–2 are thereby made to follow the repeated impulses and in turn step selector IS–3 by means not shown to the level corresponding to the impulses of a first digit. Responsive to reaching the level, a hunting operation within that level to select an idle switch such as connector CNR–1; responsive to seizure of such a switch, switchthrough relay 200 of the selector operates and is thereafter held operated from ground transmitted over conductors C23 to the sleeve wiper, thence to relay 200 which in turn passes back ground by way of make contacts 215 to conductor C29–1 to hold the incoming switching relay 820 operated in the well known manner.

Assuming that connector CNR–1 is in a level with a group of connectors, all of which require that the previously described pad be effective, V wiring on the level marking banks supplies ground to the auxiliary wiper W2 of incoming selector IS–3. The presence of V wiring operates level responsive relay 630 by extending ground from wiper W2 to make contacts 211, conductors C26 to the lower winding of level responsive relay 630. Operation of level responsive relay 630 releases pad controlling relay 900 by opening at break contacts 531 the latter relay's previously described operating and holding circuit. Release of relay 900 is effective to release pad repeater relay 910 to short out the leg elements of the pad circuit and to open the cross member as previously described. Operation of transfer contacts 532 and 631 on level responsive relay is without effect at this time.

Should the selector IS–3 have been directively stepped to a level which was not marked by the V wiring, that is, a level on which pad switching control is not required, the XX brushes of incoming selector IS–3 do not find ground on the level marking terminals so that level responsive relay 630 is not operated. In this event, the operating circuit for pad relay 900, comprising battery from break contacts 331 by way of resistor R5, break contacts 531 on the pad controlling relay, is left closed for the duration of a connection involving such a level so that pad repeater relay 910 remains operated from contacts 901 to keep the H pad inserted in the trunk TWT for the duration of the call.

Returning to the pulse repeating operation in termination TT-1, responsive to the first release of signal responsive relay 800, a circuit is completed to operate shunt relay 830 at the break portion of contact 801, make contacts on incoming switching relay 820 and the operating winding of shunt relay 830. Operation of the make contacts 723 and the make portion of make-before-break contacts 722 shorts out impedance coil 810 so that the pulsing contacts 802 are connected directly between conductors C28 and C29. Operation of the make-before-break contacts 732 and 734 is effective as previously described to split the connection between trunk TWT and termination TT-1 and to introduce artificial line terminations comprising of capacitor C7 and resistor R7 and capacitor C113 and resistor R18 across the thus formed ends to provide terminations during pulsing.

Shunt relay 830, being a slow released type, is held operated for the duration of the entire train of impulses which comprise each digit transmitted from office C, so that the separation of the incoming selector from the talking circuit of trunk TWT and the connection of the artificial line termination for trunk TWT is for the duration of each train of repeated impulses. At make contact 831, a circuit is completed to the operating winding of relay 840 of shunt repeater.

Operation of shunt repeater relay is effective as previously described: at make contacts 711 to prepare a second path for completing the above described artificial line termination for trunk TWT; at make contacts 841 to extend another source of busy indicating ground to conductor C12 to mark the termination bank appearance of trunk TT-1 to which selector IS-1 has access; at contacts 842 to open the operating winding of incoming switching relay 821; and at contacts 844 to open the loop path for the relay 210 of the incoming selector IS-3.

At the end of a train of impulses from office C, signal responsive relay 800 comes to rest in the operated position so that the operating circuit for relay 830 is opened for a time sufficient to allow shunt relay 830 to release, thereby opening the short around impedance coil 800 and opening the first connecting path for artificial line termination at the make portion of contacts 734. The connection between trunk TWT and incoming selector IS-3 is re-established and the operating circuit for shunt repeater relay 840 is opened.

Shunt repeater relay 840 thereupon releases, opening the above described second path for the artificial line termination comprising capacitor C7 and resistor R7, removes the auxiliary busy marking ground from conductor C12, recloses the operating circuit at break contacts 842 of incoming switching relay 820, and reconnects the operating loop circuit at break contacts 844 by which selector IS-3 was seized originally.

Upon the selection of an idle connector circuit, such as CNR-1, further directive signals from office C transmitted in the above described manner into the incoming loop of connector CNR-1 (not shown) advance the connector in its primary and secondary directions to the terminals of a subscriber's telephone line, such as ST-1. Automatic signaling of the telephone ST-1 is then carried out in the well known manner by connector CNR-1.

In the event that selector IS-3 fails to find an idle connector having a termination in the level selected, the switch is stepped into the overflow position thereby operating overflow contacts OF to transfer conductor 27 from ground to battery pulsed at the rate of 60 impulses per minute supplied by way of resistor R21. The 60 IPM battery operates supervisory responsive relay over the following circuit: make contacts 825 on incoming switching relay 820, the winding of supervisory responsive relay 650, to ground at break contacts 831 of the shunt relay 830. Relay 650 thereafter follows the battery pulses to connect a ground to the winding of shunt repeater relay 840 at preliminary make contacts 652. Current flowing from contacts 652 is also effective to charge capacitor C6 by way of resistor R6 and break portions of preliminary contacts 641 on relay 540. Relay 650 then operates fully to open at contacts 651 the charging circuit for capacitor C6 and the energizing circuit for relay 840. Subsequent discharging of the capacitor through the winding of relay 840 holds the latter operated during the period that relay 650 is released and fully operated, so that relay 840 is held steadily operated while relay 650 is following pulses. Operation of relay 840 at this time inserts the artificial line termination comprising capacitor C7 and resistor R7 by closing the previously described second path at contacts 711 across the trunk conductors C703 and C704 which is coupled inductively to two-way trunk TWT.

At the conclusion of a call if the called subscriber at telephone ST-1 hangs up first, supervisory equipment within connector CNR-1 causes the release of supervisory responsive relay 650 by transferring the connection of conductor C20 from resistance battery to resistance ground in the well known manner, thereby extending the resistance ground by way of the HS conductor of incoming selector IS-3, the make portions of contacts 212 on switchthrough relay 200, conductor C27, make contacts 825 on incoming switching relay 820, to the winding of the supervisory responsive relay 650 to short the winding of relay 650. Relay 650 releases to restore, at the break portion of contacts 653, conductor C702 from its connection to battery by way of resistance lamp LP8 to ground. Transfer of conductor C702 from battery potential to ground potential is operative to transmit a supervisory signal through the winding of signaling relay 920 to the supervisory equipment in trunk termination TT-2 by way of the simplex circuit derived from the conductors of trunk TWT. Supervisory equipment in trunk termination TT-2 is further operative to repeat this supervisory signal backward in the connection to the originating equipment which was used to seize outgoing trunk OT-2. Signaling relay 920 is held operated at this time so long as the office C apparatus is held in its operated condition by the originating equipment.

Responsive to the receipt of supervisory signals, such as the one just described, or without such supervisory signals, the connection between the apparatus in office C and the apparatus in office B by way of incoming selector IS-3 may be released by the originating equipment at office C as follows. The originating equipment, such as outgoing trunk OT-2, is returned to its normal, on-hook condition at office C and thereby transmits a supervisory signal to termination TT-2. In termination TT-2 the signal is operative to transfer the signaling conductor in office C which corresponds to C702 in office B from its connection to battery to ground thereby causing relay 920 in office B to release. Release of relay 920 opens the operating circuit of signal responsive relay 800 to allow the latter to release for a sufficient time to allow connector CNR-1 to be released by opening the above described loop of the connector CNR-1 at contacts 802. Opening of the loop of connector CNR-1 functions in the well known manner to remove ground from conductor C23, the sleeve conductor of incoming selector IS-3 to release switchthrough relay 200 to restore incoming selector IS-3 to restore to its normal position. Removal of ground from the conductor C23 to release relay 200 is also operative to remove ground from conductor C29-1 to open the previously described holding circuit and thereby release incoming switching relay 820. Release of incoming selector IS-3 is effective to open the holding circuit for level responsive relay 630 to cause the latter to release by releasing auxiliary wiper W2 to its normal position to remove the V wiring ground from the previously described operating circuit of relay 630.

Also responsive to the release of signal responsive relay 800, and before the release of incoming switching relay 820, shunt relay 830 is operated to mark termination TT–1 busy to incoming selectors such as IS–1 over a circuit including the break portions of contacts 801 and contacts 823 to the winding of shunt relay 830 to reoperate that relay for the duration of the releasing operation. The shunt relay being a slow release type is held operated for an interval following its de-energization which occurs when incoming switching relay 820 has been released as previously described. Operation of the shunt relay 830 is effective to place ground at contact 831 on the winding of shunt repeater relay 840, which in turn is operated and is effective at make contacts 841 to extend a marking ground by way of break contacts on busy key BK to conductors C12 to mark the terminals appearing in the selector bank to which selectors such as IS–1 as being busy until such time as the releasing operation of termination TT–1 has been completed.

The peg count lead PC is energized to register the call upon the release of incoming switching relay 820 and during the operation of shunt repeater relay 840 by extending ground at contacts 431 of seizure responsive relay 430 to the break contacts of busy key BK, conductors C40, break contacts of relay 540, conductors C60, the break contacts on incoming switching relay 820, the make portion of contacts 843 on shunt repeater relay 840, to the peg count lead PC, to energize the latter so long as relay 840 is held operated.

At break contacts 844, the seizing loop of the incoming selector circuit IS–2 is held open for the duration of the releasing process of trunk termination TT–1 to guard incoming selector IS–3 against false seizure. At contacts 842, operation of relay 840 is effective to open the operating circuit of incoming switching relay 820 to further guard against operation of the latter relay to prevent false seizure of incoming selector IS–3 during the releasing process of trunk termination TT–1. Shunt repeater relay 840 is then released upon the release of shunt relay 830 which opens the circuit for energizing the winding of relay 840 at make contacts 831.

Thus, from the above description it is seen that pad control is effected responsive to seizure of termination TT–1 from either the switch train comprising incoming selector IS–1 or from position OP by operating seizure responsive relay 330 which in turn is operative to cause control pad controlling relay 900 to render the pad comprising resistors R21—R26 and capacitor C901 ineffective to limit the transmission level in the two-way trunk TWT. Further pad control is achieved when the distant office C seizes trunk TWT and causes incoming selector IS–3, associated with termination TT–1, to be advanced to a particular level by operating level responsive relay 630 to control pad controlling relay 900 to achieve similar results.

Level responsive relay 630 which is used to achieve control of the pad controlling means is also reused as previously described in the means for sending a timed signal forward. In the latter function, relay 630 is operative in cooperation with shunt relay 830 to provide a path for reoperating signal controlling relay 520 at the end of a predetermined time.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone system, a first office, a second office, a two-way trunk connecting said offices, a termination for said trunk in said first office, an incoming switch accessible from said termination and operable responsive to directive signals from said second office, first and second points of access to said termination, first and second means in said first office for seizing said trunk over said first and said second points of access, respectively, means in said second office for seizing said trunk, means in said termination operative responsive to seizure of said trunk by said second office seizing means for preparing said incoming switch for receiving directive signals from said second office, a pad for controlling the transmission level on said trunk, controlling means for rendering said pad effective, means operative when said termination is in normal condition for energizing said controlling means, means operative responsive to seizure of said trunk by said first and second seizing means for de-energizing said controlling means, means operative responsive to operation of said incoming switch for causing de-energization of said controlling means, and further means comprising said first seizing means for thereafter re-energizing said controlling means.

2. In a telephone system, a first office, a second office, a two-way trunk connecting said offices, a termination for said trunk in said first office, an incoming switch comprising a plurality of levels accessible from said termination and operable to any one of said levels responsive to directive signals from said second office, first and second points of access to said termination, first and second means in said first office for seizing said trunk over said first and said second points of access, respectively, means in said second office for seizing said trunk, means in said termination operative responsive to seizure of said trunk by said second office seizing means for preparing said incoming switch to receive directive signals from said second office, a pad in said termination for controlling the transmission level on said trunk, means for controlling the insertion and removal of said pad from said trunk, a first energizing means normally effective for causing said pad controlling means to render said pad effective, means operative responsive to seizure of said trunk by said first and second seizing means for rendering said first energizing means ineffective to cause said pad controlling means to render said pad ineffective, means operative responsive to selection of any one of a particular group of said levels of said incoming switch for rendering said first energizing means ineffective to cause said pad controlling means to render said pad ineffective, and a second energizing means comprising said first seizing means for causing said control means to render said pad effective responsive to seizure of said termination from said first point of access.

3. In a telephone system, a first office, a second office, a two-way trunk connecting said offices, a termination for said trunk in said first office, an incoming switch comprising a plurality of levels accessible from said termination and operable to any one of said levels responsive to directive signals from said second office, first and second points of access to said termination, an operator position comprising a cord circuit and a switch train in said first office for seizing said trunk over said first and said second points of access, respectively, means in said second office for seizing said trunk, means in said termination operative responsive to seizure of said trunk by said second office seizing means for preparing said incoming switch to receive directive signals from said second office, a pad in said termination for controlling the transmission level on said trunk, a relay capable of being in normal and operated conditions for rendering said pad ineffective and effective, respectively, a first path for energizing said relay, said first path being normally closed to energize said pad controlling relay, a relay operative responsive to seizure of said trunk by said first and second seizing means for opening said first path to cause the release of said pad controlling relay and thereby render said pad ineffective, a relay operative responsive to selection of any one of a particular group of said levels of said incoming switch for opening said first path to cause the release of said pad controlling relay and thereby render said pad ineffective, and a second path comprising said cord circuit for at times energizing said pad controlling relay to render said pad effective responsive to seizure of said termination from said first point of access.

4. In a telephone system, a first office, a second office, a two-way trunk connecting said first office to said second office, a termination for said trunk at said first office, an incoming switch accessible from said termination and operable responsive to directive signals from said second office, means in said first office for seizing said termination, means in said termination operable responsive to seizure by said first office means, signaling means operable responsive to said seizure responsive means for seizing said trunk and thereafter controlling signaling to said said office, means at said second office for seizing said termination, means in said termination operative responsive to seizure of said trunk by said second office means for preparing said switch to receive directive signals from said second office, a pad for limiting transmission level on said trunk, first means operative responsive to operation of said switch for rendering said pad effective, second means in said termination controllable by said first office seizing means for controlling said signaling means to cause the latter to signal said second office, third means thereafter responsive jointly to said signaling means and said first office seizure responsive means for controlling said first means, said first means and said second means jointly controlling said signaling means to cause the latter to stop signaling said second office.

5. In a telephone system, a first office, a second office. a two-way trunk connecting said first office to said second office, a termination for said trunk at said first office, an incoming switch accessible from said termination and operable to any of a plurality of levels responsive to directive signals from said second office, means in said first office for seizing said termination, means in said termination operable responsive to seizure by said first office means, a signaling relay operable responsive to said seizure responsive means for seizing said trunk and thereafter controlling signaling to said second office, means at said second office for seizing said termination, means in said termination responsive to seizure of said trunk by siad second office means for preparing said switch to receive directive signals from said second office, a pad in said termination for limiting the transmission level on said trunk, pad controlling means for rendering said pad effective and ineffective, said pad controlling means being normally operative to render said pad ineffective, first means operative responsive to operation of said switch to any one of a particular group of said levels for causing said pad controlling means to render said pad effective, said first office seizure responsive means operative for causing said pad controlling means to render said pad ineffective, second means in said termination operable by means comprising said first office seizing means for releasing said signaling relay to signal said second office, third means thereafter jointly controlled by said signaling relay and said first office seizure responsive means for controlling said first means, said first means and said second means jointly effective for reoperating said signaling relay to cause the latter to stop signaling said second office.

6. In a telephone system, a first office, a second office, a two-way trunk for connecting said first office to said second office, a termination for said trunk at said first office, an incoming switch accessible from said termination and operable to any of a plurality of levels responsive to directive signals from said second office, means in said first office for seizing said termination, a relay in said termination operable responsive to seizure of said termination by said first office means, a signaling relay operative responsive to operation of said seizure responsive relay for seizing said trunk and thereafter controlling signaling to said second office, means at said second office for seizing said termination, means in said termination responsive to seizure of said trunk by said second office means for preparing said switch to receive directive signals from said second office, a pad in said termination for limiting the transmission level on said trunk, a pad controlling relay normally operated for rendering said pad effective, a first relay operable responsive to operation of said switch to any one of a particular group of said levels for de-energizing said pad relay to cause the latter to render said pad ineffective, operation of seizure responsive relay being effective to release said pad relay to render said pad ineffective, a second relay controllable by said first office seizing means for releasing said signaling relay to signal said second office, a third relay operative responsive to release of said signal relay and operation of said seizure responsive relay for operating said first relay, operation of said first and said second relays jointly effective for reoperating said signaling relay to cause the latter to stop signaling said second office.

7. In a telephone system, a first office, a second office, a two-way trunk connecting said offices, a termination for said trunk in said first office, an incoming switch accessible from said termination operative responsive to directive signals from said second office, means in said second office for seizing said trunk, means in said termination operative responsive to seizure of said trunk at said second office for preparing said switch to receive directive signals from said second office, a pad for limiting transmission on said trunk, pad controlling means normally operative for rendering said pad effective, means operative responsive to operation of said switch for causing said pad controlling means to render said pad ineffective, an operator position in said first office comprising means for seizing said termination, means responsive to seizure of said termination by said first office seizing means, means responsive to operation of said first office seizure responsive means for controlling signaling to said second office, first and second signal devices associated with said first office seizing means, first means responsive to said first signaling device for causing said signal controlling means to signal said second office, means operative responsive to said first means for further controlling said switch responsive means, said switch responsive means thereupon being effective for causing said signal controlling means to stop signaling said second office, said second signal device controlling said first means and controlling said signal controlling means, and other means responsive jointly to said first means and said second signal device for making said switch responsive means inoperative with respect to said signal controlling means.

8. In a telephone system, a first office, a second office, a two-way trunk connecting said offices, a termination for said trunk in said first office, an incoming switch accessible from said termination operative to any of a plurality of levels responsive to directive signals from said second office, means in said second office for seizing said trunk, means in said termination operative responsive to seizure of said trunk at said second office for preparing said switch to receive directive signals from said second office, a pad associated with said termination for limiting transmission on said trunk, means normally operative for rendering said pad effective, means operative responsive to operation of said switch to any one of a particular group of said levels for causing said pad controlling means to render said pad ineffective, an operator position in said first office comprising means for seizing said termination, means in said termination operative responsive to seizure by said first office, a relay operative responsive to operation of said first office seizure responsive means for seizing said trunk and thereafter controlling signaling to said second office, first and second signal devices associated with said operator position seizing means, releasing means operative responsive to said first signaling device for releasing said signal controlling relay to signal said second office, means operative responsive to the release of said signal controlling relay and operation of said first office seizure responsive means for operating said level responsive means, operation of said level responsive means thereupon being effective to reoperate said signal controlling relay to end the signal to said second office, said second signal device effective for operating said releasing means, said second signal device and said releasing means thereafter jointly controlling said signal controlling relay, and other means operative responsive to joint operation of said releasing means and said second signal device for making said level responsive means inoperative with respect to said signal controlling relay.

9. In a telephone system, a first office, a second office, a two-way trunk connecting said offices, a termination for said trunk in said first office, an incoming switch accessible from said termination operative to any of a plurality of levels responsive to directive signals from said second office, means in said second office for seizing said trunk, means in said termination operative responsive to seizure of said trunk at said second office for preparing said switch to receive directive signals from said second office, a pad associated with said termination for limiting transmission on said trunk, a pad relay arranged for rendering said pad effective and ineffective when in operated and released conditions, respectively, means in said termination for normally holding said pad relay in operated condition, a relay operative responsive to selection of any one of a particular group of levels by said switch for releasing said pad relay, an operator position in said first office comprising a cord circuit for seizing said termination, a relay in said termination operated responsive to seizure of said termination by said cord circuit, a relay operated responsive to operation of said seizure responsive relay for seizing said trunk and thereafter controlling signaling to said second office, first and second signal devices associated with said cord circuit, a first relay operative responsive to said first signaling device for releasing said signal controlling relay to signal said second office, a second relay operative responsive to the release of said signal controlling relay and operation of said seizure responsive relay for operating said level responsive relay, operation of said level responsive relay thereupon being effective to reoperate said signal controlling relay to stop the signal to said second office, said second signal device effective for operating said first relay, said second signal device and said first relay thereafter jointly controlling said signal controlling relay, and a third relay operative responsive to joint operation of said first relay and said second signal device for making said level responsive relay inoperative with respect to said signal controlling relay.

References Cited in the file of this patent

UNITED STATES PATENTS

| | | |
|---|---|---|
| 2,042,828 | Buchanan | June 2, 1936 |
| 2,119,209 | Hall et al. | May 31, 1938 |

UNITED STATES PATENT OFFICE

CERTIFICATE OF CORRECTION

Patent No. 2,806,086 September 10, 1957

Charles R. Fisher, Jr.

It is hereby certified that error appears in the printed specification of the above numbered patent requiring correction and that the said Letters Patent should read as corrected below.

Column 1, line 38, for "include" read --including--; column 2, line 8, after "form" insert --of--; line 53, for "connection" read --connections-- line 69, for "thte" read --the--; column 4, line 32, for "section" read --selection--; column 7, line 70, after "attendant" insert --at--; column 14, line 24, for "selector" read --selectors--; column 19, line 17, for "said", first occurrence, read --second--; line 45, for "siad" read --said--.

Signed and sealed this 12th day of November 1957.

(SEAL)
Attest:

KARL H. AXLINE

Attesting Officer

ROBERT C. WATSON
Commissioner of Patents